March 8, 1938. C. U. STEPHENS 2,110,561
DUST COVER CONSTRUCTION
Filed Nov. 9, 1935
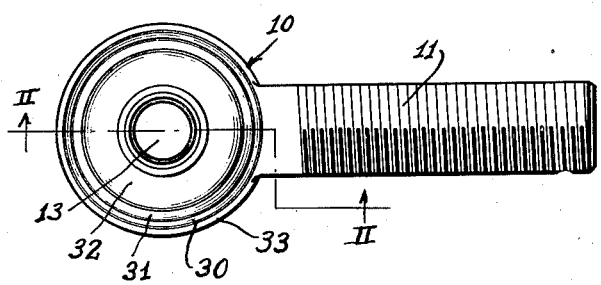
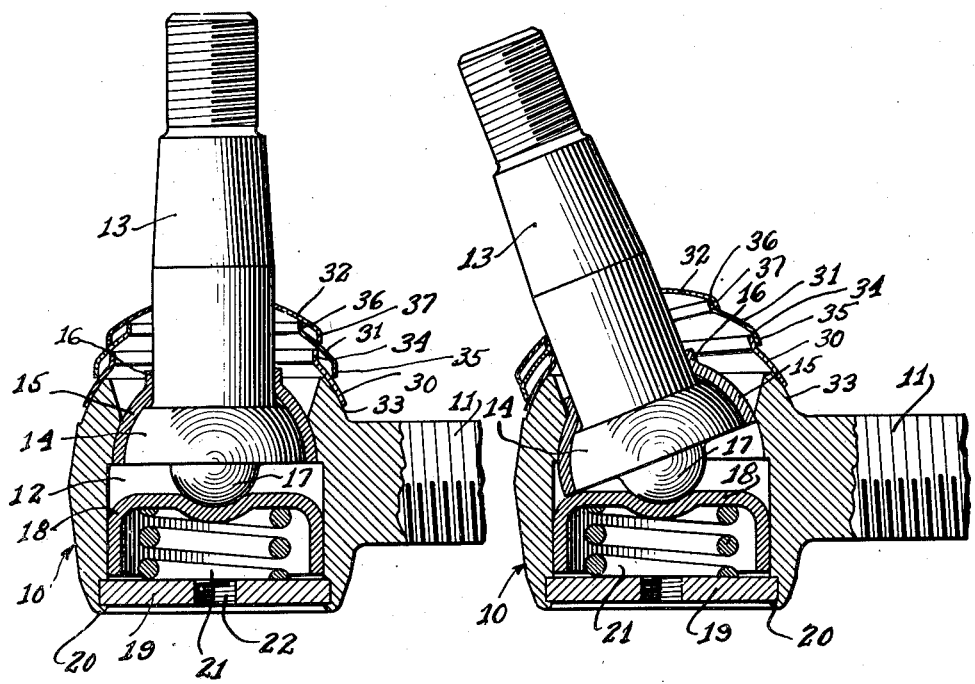

Patented Mar. 8, 1938

2,110,561

UNITED STATES PATENT OFFICE 2,110,561

DUST COVER CONSTRUCTION

Charles U. Stephens, Detroit, Mich., assignor to Thompson Products Incorporated, Cleveland, Ohio, a corporation of Ohio Application November 9, 1935, Serial No. 48,972

3 Claims. (Cl. 287—90)

This invention relates to a seal or dust cap for oscillatory joints.

More specifically, this invention relates to a dust cap construction for tie rod joints of the type having a housing and a freely movable stud extending therefrom.

It is an object of this invention to provide a metal seal for oscillatory joints which does not interfere with the operation of the joints.

A further object of this invention is to provide an articulated dust cap composed of a plurality of metal rings for sealing the housings of oscillatory joints from outside influences.

A further object of this invention is to provide a dust cover for tie rod joints adapted to be disposed around the studs of such joints without interfering with the movements of the studs.

A specific object of this invention is to provide a metal dust cover for tie rod joints which can be readily fabricated from low priced material at a low cost.

Other and further objects of this invention will be apparent from the following detailed description of the annexed sheet of drawings which forms a part of this specification and discloses a preferred embodiment of the invention.

On the drawing:

Figure 1 is a top plan view of a tie rod joint having a dust cover according to this invention mounted thereon.

Figure 2 is an enlarged cross-sectional view taken substantially along the line II—II of Figure 1, with parts shown in elevation and with a part broken away.

Figure 3 is a vertical cross-sectional view, with parts in elevation and a part broken away, similar to Figure 2 but showing the stud in tilted position to illustrate the operation of the dust cover.

As shown on the drawing:

The tie rod joint illustrated on the drawing is fully described and claimed in the Hufferd and Graham Patent No. 2,009,401 dated July 30, 1935 and comprises a housing or socket member 10 having an integral threaded shank portion 11 extending laterally therefrom. The shank portion 11 is adapted to be threaded into the end of a tie rod.

The housing 10 is provided with a cylindrical axial bore 12 for receiving the end of a stud 13 therein. The end of the stud 13 is provided with a segmental spherical bearing portion 14 seated in a segmental spherical seating element 15, which element 15 also has a cylindrical collar portion 16 in engagement with the cylindrical portion of the stud for transmitting tilting motions of the stud to the seating element. The stud, however, can freely rotate within the seating element 15.

The bottom of the stud has a segmental sphere or ball end 17 formed thereon which is seated in a dished cup member 18 slidable within the housing. A closure plate 19 is spun into the bottom of the housing as shown at 20, and a coiled spring 21 is held under compression between the closure plate 19 and the dished cup 18. The closure plate 19 is provided with a threaded opening 22 in the central portion thereof for receiving a removable plug, so that lubricant may be supplied to the joint.

The above description indicates that the stud 13 is universally mounted in the housing 10 and can be freely rotated and tilted in all directions.

The dust cover of this invention comprises a plurality of segmental spherical annular members or rings 30, 31, and 32 in superimposed nested relation.

The bottom ring 30 is adapted to slide over a rounded portion 33 of the housing 10, as is evident from a comparison of Figures 2 and 3. This bottom member 30 also has a turned up rim or lip 34 around the inner or top periphery thereof.

The intermediate ring 31 has a depending rim or lip 35 formed around the outer periphery thereof and an upturned rim or lip 36 formed around the inner periphery thereof. Likewise the top member 32 has a depending rim or lip 37 formed around the outer periphery thereof. The inner periphery of the top member 32 snugly engages the stud 13.

When the stud 13 is tipped relative to the housing 10, the ring 32 moves with the stud 13 and slides over the intermediate member 31 until the lip 37 of the member 32 contacts the lip 36 of the ring 31, as shown in Figure 3. The ring 32 then pulls the ring 31 over the bottom ring 30 until the rim or lip 35 of the ring 31 contacts the lip or rim 34 of the bottom ring 30. Then the ring 31 being pulled by the ring 32, in turn, pulls the bottom ring 30 to slide over the curved portion 33 of the housing. This permits a free movement of the stud 13 in all directions without breaking the seal for the housing. The members are designed of such size so that the stud reaches its angle of greatest tilt before the member 30 is pulled off of the curved portion 33 of the housing. In other words, as shown in Figure 3, the stud 13 has reached its angle of greatest tilt and the bottom ring 30 still covers a portion of the curved rim 33 of the housing.

It should be understood that the housing 10 need not be specially formed with a curved portion such as 33, but that the bottom member of the dust cover can be shaped to snap over any size or shape edge of a tie rod housing. Furthermore, it is not necessary for the bottom member 30 to slide relative to the housing 10, since two or more superimposed rings can be used to provide all of the necessary sliding movements so as not to interfere with the operation of the joint.

From the above description, it should be evident that I have provided a simple metal dust cover for oscillatory joints composed of a plurality of nested or telescoped rings adapted to slide over each other, with the bottom ring adapted to snugly fit around the housing of the joint, and the top ring adapted to snugly fit around the stud of the joint. The stud can, therefore, be tilted in all directions without interference while, at the same time, the joint housing is sealed against ingress of dirt.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A seal for an oscillatory joint of the type having a housing and a freely movable stud extending therefrom, comprising a plurality of telescoped annular metal members having a segmental spherical contour, the top member of said telescoped members being adapted to snugly fit around the stud of a joint and having a depending rim on the outer periphery thereof slidable along the member therebeneath, the bottom member of said telescoped members being adapted to snugly fit around the top of the joint housing and having an upturned rim around its inner periphery, and the intermediate member or members having an upturned rim around the inner periphery thereof and a depending rim around the outer periphery thereof cooperating with the rims of the adjacent members to prevent any of the members from sliding apart during oscillations of the stud.

2. A sealing member for tie rod joints of the type having a housing and a freely movable stud projecting therefrom, comprising an annular metal member adapted to be fitted over the joint housing having an upturned rim around the top thereof, a second annular member of smaller diameter than the first mentioned member slidable thereover and having a depending rim at the outer peripheral edge thereof adapted to abut the upturned rim of the first mentioned member to hold the members in assembled relation and also having an upturned rim around the inner periphery thereof, and a third annular metal member of smaller diameter than the second member adapted to fit snugly around the stud of the joint and having a depending rim at the outer periphery thereof for abutting the upturned rim of the second member.

3. A dust cap for tie rod joints of the type having a housing with a segmental spherical edge portion and a stud projecting from said housing, comprising three superimposed segmental spherical metal rings of progressively decreasing diameter, the bottom ring being adapted to slide over the segmental spherical edge portion of the housing and the top ring being adapted to snugly fit around the stud, said rings having depending rims formed around adjoining peripheral edges thereof to maintain the rings in nested assembly.

CHARLES U. STEPHENS.